May 2, 1967 L. A. M. PHELAN ETAL 3,317,198
FROZEN-CONFECTION DISPENSING APPARATUS
Filed Feb. 1, 1966 4 Sheets-Sheet 2
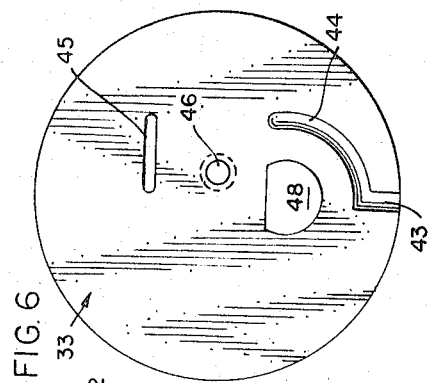
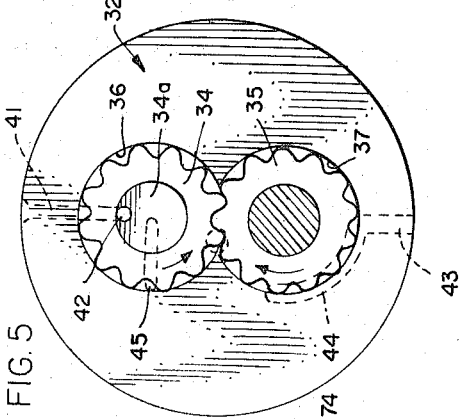
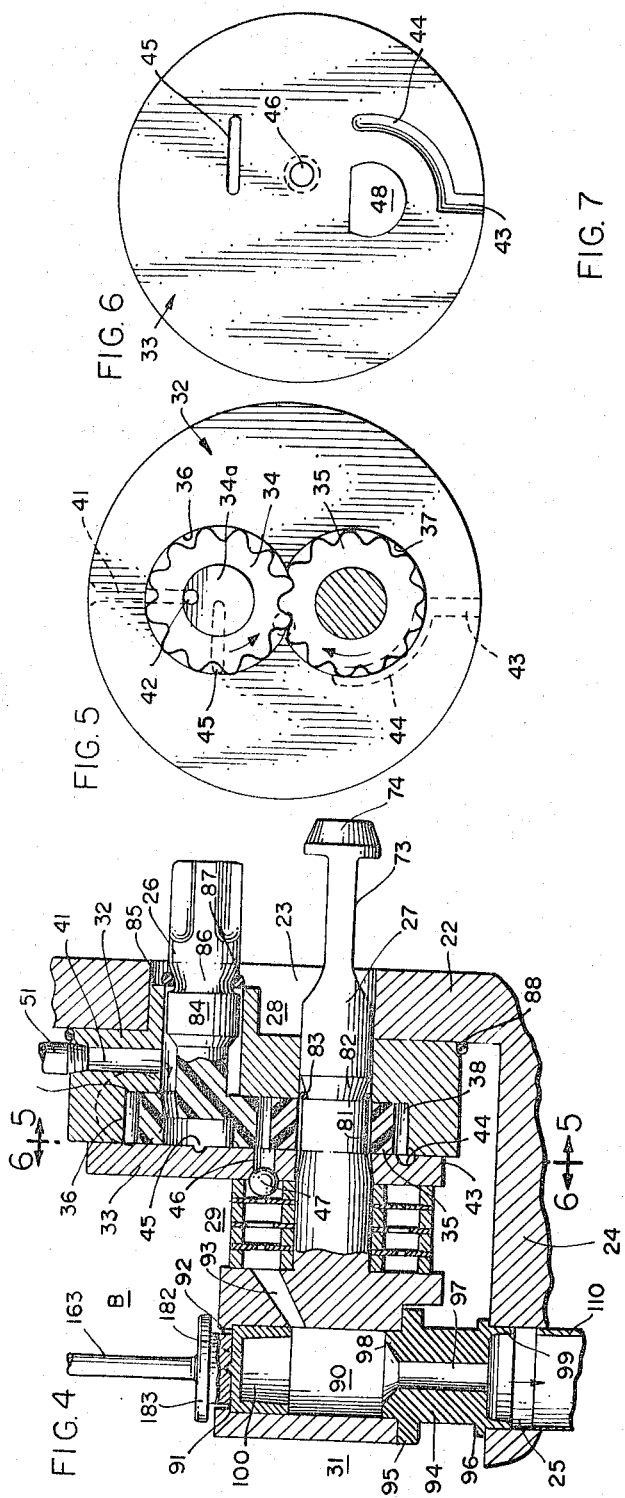
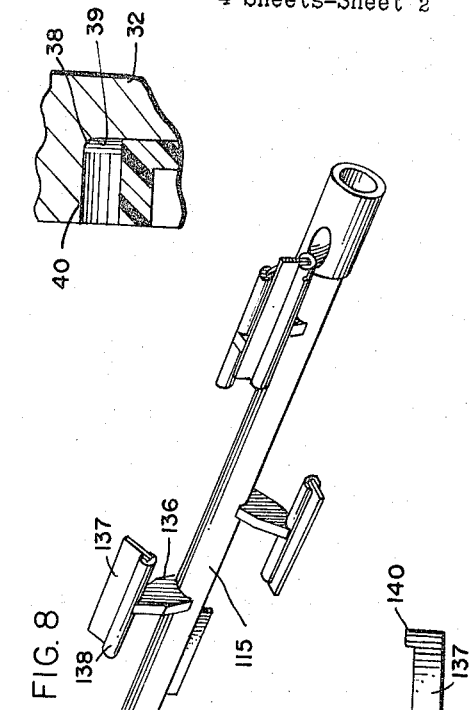
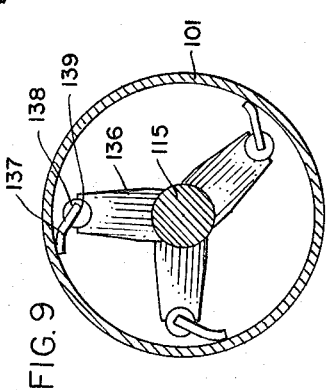
INVENTORS:
LOUIS A. M. PHELAN
HAROLD O. CADMAN
BY: Edwin Phelps
ATT'Y

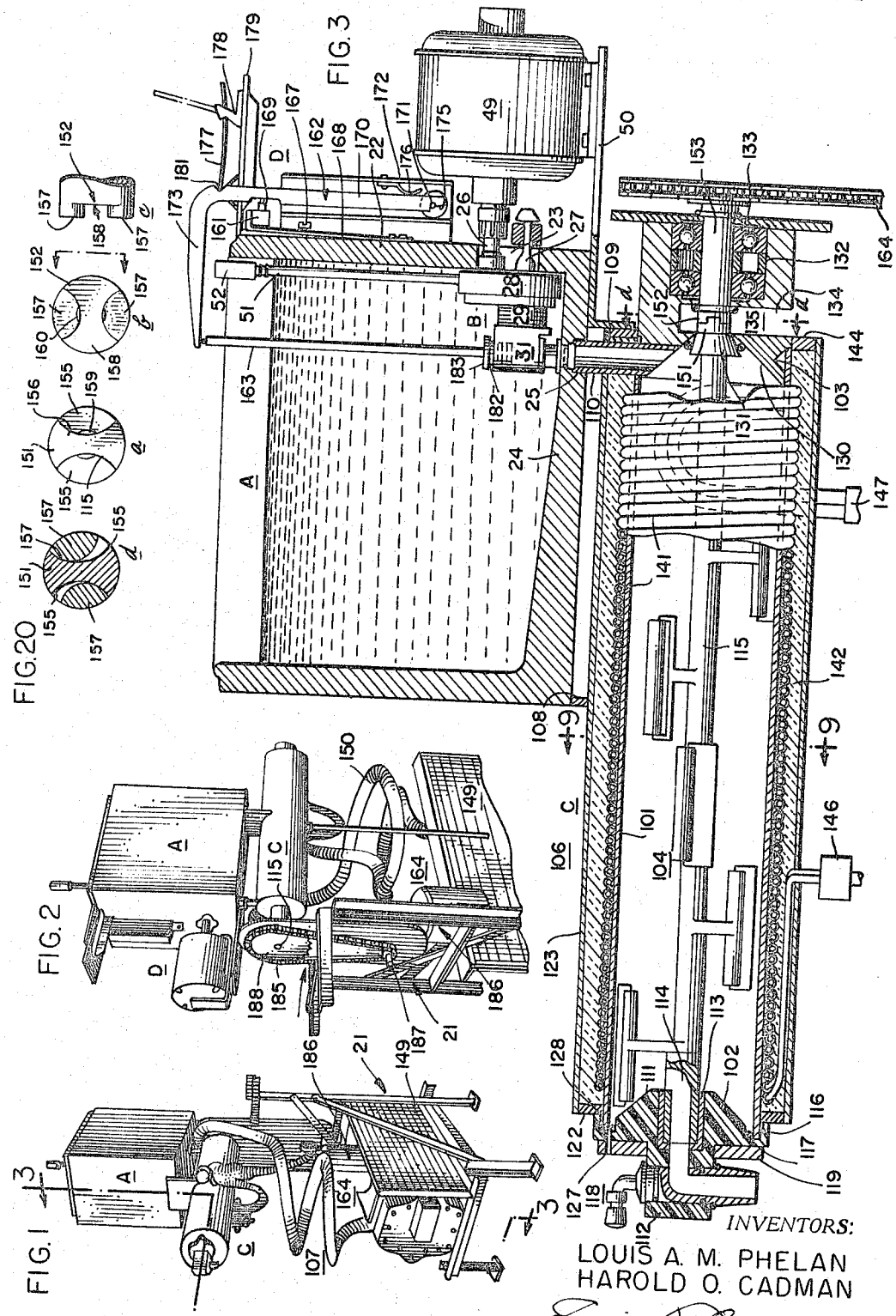

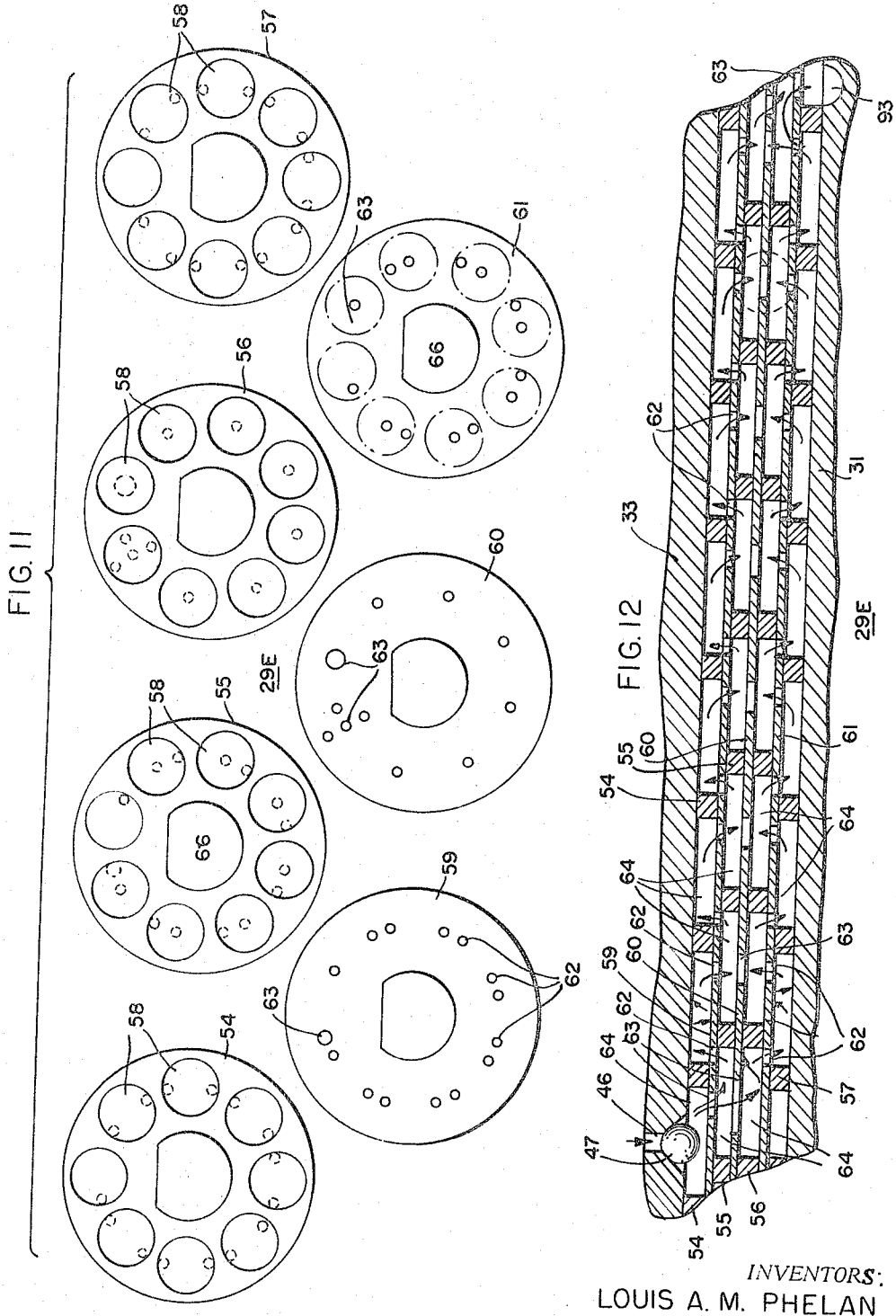

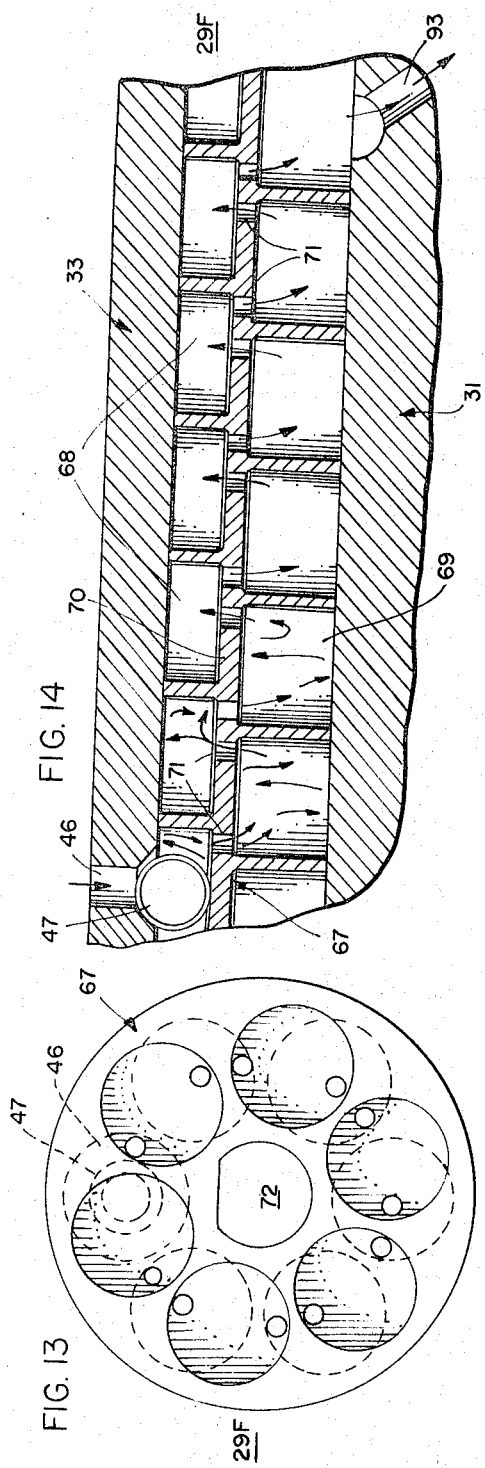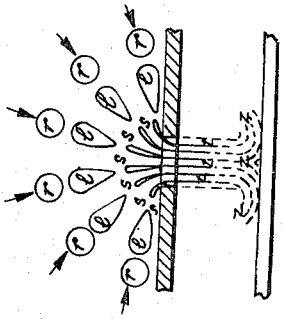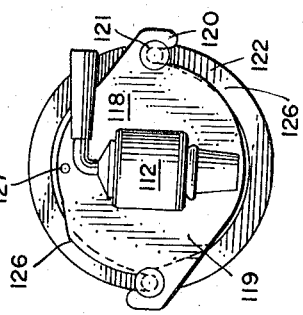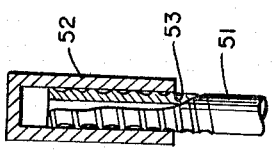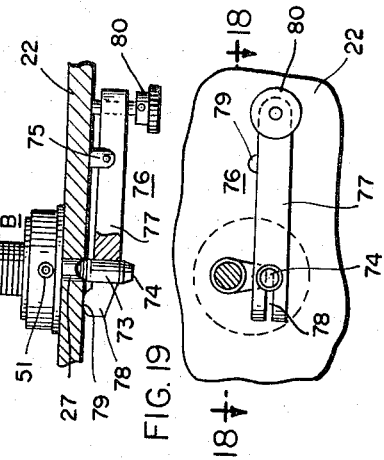

United States Patent Office 3,317,198
Patented May 2, 1967

3,317,198
FROZEN-CONFECTION DISPENSING APPARATUS
Louis A. M. Phelan, Beacon Hill, Roscoe, Ill. 61073, and Harold O. Cadman, 205 W. River St., Rockton, Ill. 61072
Filed Feb. 1, 1966, Ser. No. 524,185
10 Claims. (Cl. 261—27)

This invention relates to apparatus for the producing and dispensing of frozen confections of various kinds.

Over the years the manufacture and marketing of apparatus for the producing and dispensing of frozen confections has become a very extensive industry. Varied, indeed, have been the structuring of apparatus for this purpose. The basic purpose of such apparatus is to effect an integrated mixture of a certain amount of air or gas with an emulsion base that, in its frozen form, would have a duel appeal because of its texture and its taste.

The texture of such products makes its initial appeal to the eyes. However, the texture subsequently merges with the taste when the frozen product makes its contact with the mouth, especially the tongue. These two qualities enhance a sensation of satisfaction derived from the temperature and the sweetness of the frozen product.

Such frozen products are derived by integrating a certain percentage of air or gas with a selected emulsion. When air is not used the more common gas is carbon dioxide. An acceptable emulsion may be any liquid product wherein fatty or resinous substances are suspended as minute globules. The most common liquid product is a milk base. However, the emulsion may be a fruit juice, natural or synthetic. With a milk base containing a required percent butter fat, the resulting confection may be designated as ice cream. With a lower fat content, the confection may be designated as ice milk. With fruit juices, natural or as synthetic flavors, the product would be designated as sherbet.

The integration of air or gas with an emulsion base serves two purposes. First, the air or gas tends to establish a texture of smoothness that has appeal both to the eye and the tongue. Secondly, there is the economic factor of profit that warrants the extensive merchandising of such products. Such a factor is imperative because of the expense not only of acquiring the best equipment capable of producing a high quality product but, also, the expense of competent help to operate the equipment acceptably.

The ever inherent problem in the structuring of acceptable equipment concerns the degree of refined integration of the air or gas with the liquid. Over the years, many and varied have been the attempts at structuring equipment designed to achieve acceptable results in this respect. Almost without exception previous and current equipment has sought to effect such integration by some form of beating, whipping or stirring of the mixture in the congealing chamber. Here, the air-liquid mixture is introduced at one end for pressured flow through the chamber for solidification by the time it reaches the opposite end incident to its being dispensed therefrom as a frozen confection.

It is perfectly obvious, but seemingly not appropriately noted, that beating, whipping or stirring of the liquid-air mixture creates such heat therein as tends to retard the freezing of the mixture. Equally obvious is it that such generated heat in the mixture has to be extracted in the congealing chamber. Thus, the over-all consequences result in creating these conflicting operational costs—first, introducing heat into the mixture, secondly, extracting the heat from the mixture.

The main objects of this invention are to provide;
An improved apparatus for the producing and dispensing of frozen confection products;

An improved apparatus of this kind for effecting a very refined and thoroughly integrated blend of air or gas with the liquid before congealing in order to better control the physical qualities and palatability of the frozen product;

An improved pump-and-converter unit for jetting the mixture through a tortuous flow path of small orifices to effect such a turbulence of the mixture as to reduce to the greatest possible minimum the size of bubbles in the mixture before it enters the congealing receptacle;

An improved structure of the pump per se for effecting the mixing of the liquid and the air or gas and directing the mixture through the converter;

An improved apparatus of this kind wherein the liquid base and the air or gas are drawn from sources under normal atmospheric pressures;

An improved sanitary mounting of the pump-and-converter unit within the liquid supply tank;

An improved arrangement of refrigeration coils on the congealing receptacle to accelerate the congealing of the mixture;

An improved surface scraper in the receptacle to facilitate congealing the mixture;

An improved dispensing-closure for the congealing receptacle;

An improved mechanism whereby the conditions in the congealing receptacle regulates the operation of the pump-and-converter unit;

An improved coupling between the scraper in the congealing receptacle and the motor for driving the scraper; and An improved apparatus of this kind the various parts of which are of such simple and practical structure as to make extremely economical the manufacture and marketing of the apparatus and very facile and highly gratifying the use thereof.

In the adaptation shown in the accompanying drawings;

FIG. 1 is a front perspective view of an apparatus constructed in accordance with this invention, the cabinet housing being omitted to more clearly show the interior arranged and connecting mechanisms involved in the operation of the apparatus;

FIG. 2 is a rear perspective of the same;

FIG. 3 is an enlarged, longitudinal, sectional view taken on the plane of the line 3—3 of FIG. 1;

FIG. 4 is an enlarged, cross-sectional view of one adaptation of a pump-mixing-and-converter unit for attaining the desired finely-integrated mixture of air or gas with the liquid mix before the discharge of the mixture into the congealing receptacle;

FIG. 5 is an interior end view of the pump taken on the plane of the line 5—5 of FIG. 4;

FIG. 6 is an interior face view of the pump taken on the plane of the line 6—6 of FIG. 4;

FIG. 7 is an enlarged, cross-sectional detail of the gear-pump shown in the circle "P" of FIG 4;

FIG. 8 is a perspective view of the scraper used in the congealing receptacle for keeping the interior wall thereof clear of an accumulation of the congealed confection thereon;

FIG. 9 is a transverse, sectional view of the congealing receptacle taken on the plane of the line 9—9 of FIG. 3;

FIG. 10 is a face view of one of the removable blades for the scraper;

FIG. 11 is an exploded view of the type of converter combined with the mixing pump as shown in FIGS. 1 and 4;

FIG. 12 is a schematic of the flow path of the air-liquid mixture through the form of converter shown in FIGS. 4 and 11;

FIG. 13 is a face view of one side of another adaptation of the converter for use in combination with the mixing pump of FIGS. 4, 5 and 6;

FIG. 14 is a schematic of the flow-path of the air-liquid mixture through the form of converter shown in FIG. 13;

FIG. 15 is a schematic of what is believed to be happening to bubbles of air in the air-liquid mixture as it is pressured by the pump through the tortuous flow path formed by the pockets and the interconnecting orifices in either of the converter adaptations of FIGS. 11 and 12, or FIGS. 13 and 14;

FIG. 16 is an end elevational view of the handle-controlled dispensing front end of the congealing receptacle;

FIG. 17 is an enlarged, partly sectional, partly elevational view of the valve for controlling the air-supply to the mixing pump;

FIG. 18 is a partly sectional detail of the clamp which secures the pump-converter unit of FIG. 4 in position in the tank;

FIG. 19 is a face view of the same, the line 18—18 indicating the plane whereon FIG. 18 is taken; and FIG. 20 is an enlarged, exploded view of the parts that make up the coupling for the motor-drive for the congealing-receptacle scraper.

The essential concept of this invention involves a combination air-and-liquid mixing pump deriving controlled quantities of air and liquid—generally at atmospheric pressures—and forcing the air-liquid mixture through a tortuous flow path involving a structural series of orifice-connected pockets for the most effective miniaturization of the air bubbles in the mixture before it is discharged into a congealing receptacle for subsequent dispension as a frozen product.

An air-liquid mixing and congealing apparatus embodying the foregoing concept comprises, in the main, a liquid supply tank A, whereon is mounted a combination air-liquid mixing-pump-converter unit B for effecting a thoroughly refined integration of the air-and-liquid mixture for discharge into a congealing receptacle C from which the recurring dispension of the frozen product controls the actuation of a switch mechanism D for regulating the frequency and period of operation of the pump-converter unit B.

The imperative functioning of such a structured apparatus is, first, to achieve the highest possible foamed blending of the air and liquid without a material temperature increment and, secondly, to effect the blending of the warmer and cooler portions of the foamed mixture in the congealing receptacle without introducing a counteracting temperature increment.

*The liquid supply tank A* here is shown as of rectangular shape and mounted on a suitable supporting frame 21 at a convenient height above the floor. The material from which such a tank may be structured should be such as may be cleaned easily and completely to meet the general sanitary requirements for equipment of this kind. The tank capacity should be such as will provide a quantity of liquid acceptable for use within a predetermined time to ensure the required freshness of the subsequently frozen confection.

In the back wall 22, of the tank A, is an opening 23 just above the base 24 wherein is another opening 25. In use of the apparatus the opening 23 is sealed by the pump-converter unit B and through which opening 23 extends a drive shaft 26 and a tie-bolt 27 forming parts of the presently-described pump-converter unit B. The opening 25 is an outlet from the tank A wherein is seated parts forming a later-described fluid-flow conduit between the tank A and the congealing receptacle C. The mountings and the respective functions of the shaft 26 and the tie-bolt 27 will be explained presently.

*The pump-converter B* is one of the primary significant features of this apparatus. It comprises an axially-aligned pump 28, a converter element 29 and a transversely bored tie-bolt head 31 and through which unit the initially coarse mixture of air and liquid is caused to so flow through such a tortuously baffled path as to reduce the air bubbles to a very refined condition in the mixture before the mixture is discharged into the congealing receptacle C.

The pump 28, best shown in FIGS. 4, 5 and 6, comprises a housing in the form of a base part 32, a closure plate 33 and a pair of meshing gears 34 and 35.

The base part 32 has a pair of eccentrically-arranged cavities 36 and 37 with slightly overlapping peripheries (FIG. 5). These cavities, as here shown in FIG. 4, are of a depth sufficient to accommodate the gears 34 and 35. These cavities 36 and 37 are so formed as to provide an arcuate-shaped juncture 38 (FIG. 7) of the radially- and axially-disposed surfaces 39 and 40, respectively. Such curvature is provided to comply with the most rigid sanitary requirements to avoid all sharp corners on equipment used in the production of food products, especially such as are involved in the use of this apparatus. The base part 32 also has an air-inlet channel 41 leading radially in from the upper periphery to a transverse aperture 42 opening into a pocket 34a in the gear 36 (FIG. 5).

The closure plate 33 has a recessed liquid-inlet channel 43 formed in the face thereof which leads inwardly from the lower periphery to an interior arcuate channel 44 concentric with the axis of the cavity 37. Such arcuate channel 44 is of a width and position to overlap a quadrant of the cavity 37 defined by the teeth of the gear 35 (FIG. 5). The closure plate 33 also has an elongated slot 45 of a length and position to span a radius of the cavity 36 (FIG. 5) to direct the air flow from the aperture 42 to the periphery of the cavity 36 as defined by the teeth of the gear 34. This closure plate 33 also has an axially-located, air-and-liquid mixture outlet port 46 registering with the area of the overlapping portions of the gears 34 and 35 and the cavities 36 and 37 and leading to the converter element 29. At the outer end of this port 46 the plate 33 is chamfered to seat a ball valve 47. Also this closure plate 33 has an eccentrically-positioned truncated opening 48 (FIG. 6). This is provided to ensure a proper positioning of the plate 33 on the hereinafter-described tie-bolt 27 to dispose the outlet port 46 in proper registration with the overlapping peripheral portions of the pump-housing cavities 36 and 37 wherefrom the mixture of air and liquid is discharged from the pump 28.

The air supply to the air-inlet 41 for the pump 28 is through a tube 51 (FIGS. 3 and 17), the lower end of which is seated in the inlet 41. The upper end of the tube 51 extends above the normal liquid mix content of the tank A and mounts a rotatable cap 52. The upper part of the tube 51 has a helical groove 53 extending a short way inwardly from the tube extremity. The cap 52 is of such an internal diameter that it fits snugly over this grooved end of the tube 51. The turning of the cap 52 causes it to move axially along the tube end so as to alter the exposed length of the helical groove 53. This serves to gage the amount of air flow into the tube 51 and its admission into the gear-embracing cavity 36.

The gears 34 and 35, and the housing parts 32 and 33, are of the same size and form except for these two facts. One, the upper gear has one less tooth than the lower gear 35 (which is not imperative), and the upper gear 34 is integrated with the drive shaft 26 whereas the lower gear 35 is free to rotate on the tie-bolt 27. The exterior diameters and widths of these two gears 34 and 35 and the curvature of the peripheral edges of the teeth are so nearly identical with the respective dimensions and forms of the cavities 36 and 37 that the gears 34 and 35 are rotatively journaled in these respective cavities 36 and 37.

It is this latter fact, about these gears 34 and 35, that creates the requisite suction in their respective cavities 36 and 37 to draw the air and liquid into the respective cavities for the initial mixing thereof and pressuring into and through the converter element 29.

*The pump-converter unit B*, as best shown in FIGS. 3 and 4, is one of two of the most significant structural and functional features of this development. Such a unit is secured in contact with the inner face of the tank wall 22 with the outer end of the shaft 26 coupling with the driven shaft of a motor 49, mounted on a bracket 50 anchored to the rear of the tank A (FIG. 3). Such positioning of the pump-coupling unit B is effected by the hereinafter-described clamp (FIGS. 18 and 19).

Although thusly shown positioned in the tank A and connected to the motor 49, it should be understood that this pump-converter unit B could be arranged in the tank A disposed parallel to the tank base 24, rather than parallel with the tank rear wall 22. So positioned the drive shaft 26 would extend vertically upward and above the tank for connection to a motor 49 located above the tank.

The converter-element 29 is shown in the drawings as of two slightly different structural adaptations E and F. However, they inhere the same essential functioning. Each involves two or more series of orifice-connected pockets between pairs of plates. The 29E form of such a converter element is indicated in use position in FIGS. 3 and 4 and the structure is detailed in FIGS. 11 and 12. The 29F form of converter element is shown in FIGS. 13 and 14 and when used would be in the same position as the form 29E.

*The 29E form of converter element* comprises four disks 54, 55, 56 and 57, each with a circular series of eight round holes 58, and three circular plates 59, 60 and 61 each with a circular series of small orifices 62 and one or more larger orifices 63. As will be seen from FIGS. 4 and 12 the plates are much thinner than the disks. When the several disks and the plates are assembled, in alternate abutting axial relationship (FIGS. 4 and 12), the holes 58 in the disks become pockets 64 on opposite sides of the respective plates with adjacent pockets 64 communicating through the plate orifices 62 and 63. In FIG. 11 the orifices 62 and 63 are shown in full outline. Their functioning relationship with the holes 58 in the disks is indicated by dotted circles in FIG. 11 and in openings in FIG. 12.

The thusly-assembled disks and plates for the 29E form of converter element are functionally mounted on the tie-bolt 27 for interpositioning between the pump 28 and the tie-bolt header 31. Such an assembly creates a tortuous path for baffling and turbulating the flow of the air-and-liquid mixture as it is pressured by the pump 28 on its way to the receptacle C. The nature and action of this flow path, as indicated by the arrows in FIG. 12, will be explained in detail later herein.

It will be noted that these disks and the plates of FIG. 11 have central truncated openings 66, the flat parts of which ensure a fixed proper superpositioning of these parts on the tie-bolt 27 as will be explained presently.

*The 29F form of converter element*, as shown in FIGS. 13 and 14, comprises a one-piece molded plastic disk 67 having six circular oppositely outwardly-open pockets 68 and 69 on opposite sides of an intermediate partition 79. Certain relationships must be noted about these pockets. They are all of the same diameter but, as herein shown, the pockets on one side of the partition 70 are of greater depth than those on the other side. Although the axes of the pockets are on the same circumference those on one side of the partition 70 are offset slightly from those on the other side (FIGS. 13 and 14). For all of these pockets, except the two uppermost opposed ones, the dividing partition has two orifices 71 registering with each pair of opposed pockets 68.

When this pocket disk 67 is interposed between the closure plate 33 of the pump 28 and the tie-bolt head 31, the pockets 68 and 69 are closed, thereby providing in this converter element 29F a tortuous path for baffling and turbulating the flow of the air-and-liquid mixture, as it is pressured by the pump 28, on its way to the receptacle C. The nature and action of such a flow will be explained later.

It will be noted here that the disk 67 has a central truncated opening 72 (FIG. 13) the flat part of which ensures a correct positioning of the disk 67 on the tie-bolt 27.

The form of this tie-bolt 27, for thus securing either of these converter element adaptations 29E and 29F in functioning relationship with the pump 28 is best shown in FIG. 4. The tie-bolt 27 is of a length to extend well outwardly of the rear tank wall 22. Such rearwardly-extending end is recessed to form a flat part 73 with a terminal knob 74 for coacting engagement with a clamp 76.

The clamp 76 is best shown in FIGS. 18 and 19. This involves a bar 77 with a tined-end 78 fulcrumed at 79 on the tank wall 22 and mounting a threaded tensioning thumb-screw 80. The tined-end 78 of the bar 77 seats over the flat part 73 of the tie-bolt 27 and the bar is shifted up against the stop 75. This will ensure the proper operative positioning of the pump-converter unit B. Thereupon the turning of the thumb-screw 80 will cause the bar 77 to draw the tie-bolt 27 outwardly. This will achieve two results. One is the firm clamping of the pump-converter unit B in operative position with the pump 28 in sealed contact with the inner wall 22 of the tank A. The other is the securing of the drive shaft 26 in operative connection with the driven shaft of the motor 49.

It is important to note (FIG. 4) that the hub part 81 of the tie-bolt 27 that passes through the gear 35 is dimensioned to provide no contact of the tie-bolt with the gear 35 since that gear is rotatively journaled in the cavity 37. A tapered groove 82 is provided rearwardly of the hub part 81 for the seating of a sealing O-ring 83.

The drive-shaft hub part 84 is dimensioned for slight clearance with the collar 85 integrated with the pump base part 32, since the integrated gear 34 is rotatively journaled in the cavity 36. However, directly outwardly of the hub part 84 the shaft 26 is formed with a groove 86 to seat a sealing O-ring 87.

The securing of this pump 28 against the inner face of the tank wall 22, by means of the clamp 76, also seats a sealing O-ring 88 around the rear perimeter of the pump base part 32.

This just-described tie-bolt positioning of the pump-converter unit B in the tank A disposes the tie-bolt head 31 in alignment with the opening 25 in the bottom 24 of the tank A.

This head 31 is of disk-shape and of a diameter slightly larger than that of the converter element 29 (E or F). Such tie-bolt head 31 has a cylindrical bore 90 extending therethrough radially of the axis of the tie-bolt 27. The form and positioning of the tie-bolt head 31 is such that the bore 90 is disposed in axial alignment with the opening 25 in the base 24 of the tank A. At its upper end the bore 90 has an internal shoulder 91 defining a slightly reduced upper open end 92 of the bore 90, for a reason to be explained presently. The head 31 also has a transversely-disposed port 93 formed therein above the axis of the tie-bolt 27 for the flow of the air-liquid mixture from the converter element 29 (E or F) into the bore 90 for discharge into the receptacle C.

An elastic spool-shaped nipple 94 (FIG. 4), with exterior end flanges 95 and 96, spans the space between the bottom of the head 31 and the congealing receptacle C, so as to complete a fluid flow conduit—indicated by the arrow 97—from the converter element 29 (E or F) to the receptacle C. With the nipple 94 in such position that the upper flange 95 seats exteriorly against the under face of the head 31 with a rim 98 telescoped into the bore 90 and the lower flange 96 seats against the tank bottom 24 with the rim 99 telescoped into the opening 25.

A flexible cup 100 is invertedly positioned in the upper end of the bore 90 in the head 31 with the base edge of the cup 100 seated against the shoulder 91. This cup 100 constitutes a diaphragm which controls the functioning of the later-described switch mechanism D.

*The congealing receptacle C,* as most clearly shown in FIG. 3, comprises a cylindrical casing 101 closed at its ends by members 102 and 103 and whereon is rotatively supported a scraper 104. The casing 101 is a section of tubing embraced by a refrigeration unit 106 connected to conventional refrigeration equipment 107.

Such a receptacle C here shown is suspended from the under side of the tank A, by a bracket 108 and the angled inner end 109 of the motor-supporting bracket 50, so that the dispensing end of the receptacle C is located well in advance of the tank A. A short length of tubing 110 connects the opening 25 in the bottom 24 of the tank A with the interior of the casing 101 and completes the conduit 97.

The front-end closing-member 102, preferably of plastic, has an inwardly-extending frusto-conical hub 111 and an outwardly-extending and axially-aligned rectangular-shaped hub 112. The hub 111 seats a bearing sleeve 113 for rotative support of the channeled end 114 of a scraper shaft 115. A peripheral flange 116 on this inner hub 111 seats over the end of the casing 101 with an internal O-ring seal 117 at the juncture of these parts. The hub 112 has a radial channel extending therethrough wherein is supported a handle-operated dispensing spigot 118 communicating with the channeled end 114 of the scraper shaft 115.

This closing end member 102 is secured in easily-removable but tightly-sealed position on the casing 101 by a plate 119 (FIGS. 3 and 16). This plate 119 has a central square opening for embracive positioning over the square hub 112 and is formed with a pair of diametrically integrated hooks 120. These hooks 120 seat over a pair of head pins 121 secured at diametrically-opposite points to an end ring 122 forming a part of the later-described housing 123 for the refrigeration unit 105. Thus the end member 102 has to be initially inserted in the casing 101 with the hooks 103 out of registration with the pins 121. When pushed into the casing 101 to seat the flange 116 over the end of the casing, a rotative movement of the plate 119, clockwise, serves to seat the hooks 120 under the head-pins 121 and cause the end-plate 119 to secure the end member 102 in firm closing position in the casing 101 regardless of the pressure of the congealed and congealing product in the casing 101. A slight counter-clockwise rotation of the plate 119 will remove the hooks 120 from engagement with the head pins 120 and permit withdrawal of the end member 102 from its closing position in the casing 101.

The plate 119 has the diametrically opposed perimetrical portions 126 so circumferentially offset as to require the plate 119 to be given a full turn clockwise to seat the hooks 120 under the pin heads 121. This makes certain that there can be no careless rotative positioning of the plate 119 such as would fail to seat the hooks 120 under the pins 121. This is imperative to ensure against an accidental blow-out of the end member 102 from the casing 101 by pressures within the casing 101.

The plate 119 also has a very small orifice 127 formed adjacently inward from the upper perimeter. This orifice 127 registers with a similar orifice 128 adjacent the perimeter of the end member 102. Such registering of these orifices 127 and 128 permits the insertion of a very small pin to depress the O-ring 117 and allow for the escape of air from the casing 101 during the first pressuring of the foamed mixture into the casing 101.

The rear end closing member 103, for the casing 101, is of much greater axial length than the front end closing member 102. The forward inner end of the member 103 is peripherally recessed to telescope into the rear end of the casing 101 (FIG. 3). The inner end of this member 103 has a conical-shaped recess 130 into which the inner end of the tubing 110 extends and which recess provides for the O-ring sealing of a truncated hub 131 on the scraper-shaft 115. A cylindrical pocket 132 extending axially inward from rear of this member 103 supports a ball bearing 133 for journalling a coupling 135 to the rear end of the scraper shaft 115, as later herein will be explained more fully. Between the recess 130 and the pocket 132 the member 103 has a radial slot 134, within which the coupling 135 is embraced for needed accessibility.

The scraper 104, as clearly shown in FIGS. 3 and 8, comprises the shaft 115 whereon is integrated an axially-spaced, radially-disposed series of T-shaped arms 136 each mounting a scraper blade 137.

The shaft 115 is of comparatively small diameter and is rotatively supported in the casing 101 by the sleeve bearing 113 and the hereinafter described coupling 135. As shown in FIGS. 3 and 8 there are eight of these T-shaped scraper-blade-supporting arms 136 each with an integrated radially-spaced hub 138. The arms 136 are spaced circumferentially 135 degrees apart and axially arranged so that the series of scraper blades 137 have contact with substantially the entire inner periphery of the casing 101 between the end members 102 and 103. The radial length of the arms 136 is such that the outer periphery of each hub 138 is spaced from the axis of the shaft 115 less than the inner radius of the casing 101 (FIG. 9). Each hub 138 has an axially-disposed peripheral groove 139 opening outwardly at an angle intermediate a radius through the scraper shaft 115 and a normal to that radius. The scraper blades 137 are of stiff flexible material, preferably plastic. They are of a length slightly greater than that of the hubs 138, and of a width greater than the space between the axis of each arm hub 138 and the opposed inner face of the casing 101. Thus, when the completely-assembled scraper 115 is in operative position in the casing 101, the outer perimetrical portions of the blades 137 are formed into a slight arcuate contour when their outer edges are contacting the inner face of the casing 101 (FIG. 9). One edge of each blade is recessed to form a pair of end lugs 140 (FIG. 10) which, when the blades are inserted in the respective grooves 139, contact with the ends of the hubs 138 to ensure the group of scraper blades 138 against shifting on the hubs.

The scraper shaft 115 has integrated with the inner end thereof the truncated hub 131 (FIG. 3) which forms a part of the presently-to-be-described coupling 135.

From FIGS. 3, 8 and 9 it should be noted what a small amount of the volumetric space within the casing 101 is displaced by the scraper shaft 115, the arms 136, the blades 137 and the hubs 138. This extreme ratio differential is one of the most significant features of the functioning of the congealing receptacle C the nature of which will be set forth explicitly in the subsequent explanation of the operation of this apparatus.

The refrigeration unit 106, as most clearly shown in FIG. 3, comprises a multiple set of small, abutting tubes 141 contactively bounded around the exterior of the casing 101 nearly the entire axial length thereof. These tubes 141 are embedded in conventional insulation material 142 extending nearly the entire length of the casing 101 and enclosed in a cylindrical housing 123 supported on end closing rings 122 and 144 (FIG. 3). As clearly shown in this FIG. 3, there are a pair of these tubes 141 abuttingly arranged. At their respective ends such pair of tubes 141 are connected to an expansion valve 146 and a suction-line connection 147 to the refrigeration equipment 107.

The use of multiple, small-diameter tubes arranged in abutting, parallel embracement of the casing 101 and connected to a common expansion valve 146 and to a common outlet connection 147 has been found to provide operational benefits. One of these has been a much quicker congealing of the mixture in the casing 101 than is possible with a single large tube equal in capacity to that of the sum of these multiple tubes. The other has been a better maintenance of the congealed condition of the mixture in the casing 101 at less frequent operation of the refrigeration equipment 107.

The refrigeration equipment 107 is shown somewhat diagrammatically in FIGS. 1 and 2. This comprises a conventional motor-driven compressor 148 and a condenser 149, mounted on the frame 21, with sections of insulated connecting tubing 150 and wherein is incorporated the usual pressure-regulating valves.

The coupling 135 is a self-aligning structure comprising the two sections 151 and 152 (FIG. 3). The section 151 here is shown integrated with the truncated hub 131 of the scraper shaft 115. The section 152 is a part of a short jack-shaft 153 supported in the ball-bearing 133.

The opposed end formation of these two sections 151 and 152 are indicated in the $a$, $b$, $c$, and $d$, views of FIG. 20. Thus, as shown in the $a$ view the section 151 has a pair of arcuate-shaped recesses 155 separated by an axially disposed projection 156. As shown in the $b$ and $c$ views of FIG. 20 the section 152 has a pair of arcuate-shaped peripheral projections 157 separated by an axial recess 158. As further indicated in the $d$ view of FIG. 20 (taken on the plane of the line $d$—$d$ of FIG. 3) the axial projection 157 and the axially-disposed recess 158 are of the same general contour. However, the peripheral extent of the arcuate recesses 155 is greater than the arcuate extent of the projections 157. The reason for these differences is that the recesses 155 are the result of two overlapping circles of the same diameter as the projections 157.

As shown in the $a$ and $b$ views of FIG. 20, small lobes 159 are formed on the curved faces of the projection 156 for seating in similarly-shaped slots 160 in the projection 157.

The switch mechanism D, whereby the conditions in the receptacle C control the recurring functioning of the pump-converter unit B, is best shown in FIG. 3. Such switch mechanism D comprises a microswitch 161, a rocker arm 162 and an actuating rod 163 for regulation of the operation of a motor-driven transmission 164 for the scraper 104.

The microswitch 161, normally biased to close the circuit to the motor 49, is fixed on the upper end of a leaf spring 168. The spring 168, in turn, is fixed at its lower end externally to the back wall 22 of the tank A. The spring 168 is tensioned to press the microswitch pin 169 into contact with the rocker arm 162 (FIG. 3).

A small screw 167 permits an adjusted limitation of the outward flexing of the leaf spring 168. This determines the point at which the microswitch 161 will be opened by the pressured retraction of the rocker arm 162, as later will be explained.

The rocker arm 162 is of inverted L shape with the lower end of the longer part 170 hinged on a pivot pin 171 in the lower end of a channeled bracket 172. The shorter part 173 of the arm 166 extends inwardly over the open end of the tank A. The bracket 172 is secured exteriorly to the rear wall 22 of the tank A to extend adjacently outward of the spring 168. The hinged connection of the longer part 170 of the rocker arm 162 on the pivot pin 171 is effected by a cut-away forming an open socket 175 which is pressed and held in position on the pivot pin 171 by a small leaf spring 176 fixed on the bracket 172. The purpose of such an open-socket pivoting of the rocker arm 162 on the pin is to permit an easy removal and replacement of the rocker arm for reasons that will be explained presently.

Another leaf spring 177, apertured near its outer end, is pivotally seated on a lug 178 fixed on a plate 179 also fixed exteriorly to the back wall of the tank A and extending rearwardly above and beyond the bracket 172. The forward end of this second leaf spring 177 is seated in a notch 181 in the rocker arm 162 adjacent the angle of the two parts 170 and 173. Such a positioned spring 177 may be withdrawn from the notch 181 and swung on the lug 178 upwardly above the plate 179 (see dotted outline FIG. 3). This will permit the rocker arm 162 to be removed from its position on the tank A.

The actuating rod 163 has its lower end integrated with a knob 182 and a flange 183. The knob 182 is slightly smaller than the open end 92 of the tie-bolt head 31 and a bit longer than the axial length of that open end 92 (FIG. 4). The flange 183 is dimensioned larger than the open end 92 to limit the downward movement of the rod 163 when that occurs. The total movement of this rod 163 is controlled by the back pressure conditions in the congealing receptacle C acting on the foamed-mixture being pressured into the tubing 110 by the operation of the pump-converter unit B. Such back pressure acts against the diaphragm-cup 100, as will be amplified in the later explanation of the operation of this apparatus.

The motor-driven transmission 164, for the scraper 104, as best shown in FIG. 2, comprises a sprocket-chain connection 185 to a conventioned motor-reduction-gear drive 186 mounted on the frame 21 below the motor 49 for the hereinbefore described pump-converter unit B. As will be noted from this FIG. 2, the sprocket chain spans a very small sprocket on the reduction gear (not shown) shaft 187 and a comparatively very large sprocket 188 on the jack shaft 153.

Before each operative use of this apparatus the tank A, the pump-converter unit B, the congealing receptacle C, and all of the removable parts associated therewith, have to be thoroughly cleansed to conform with the most rigid sanitary requirements.

To remove the pump-converter unit B requires the withdrawal of the clamp 76. The clamp 76 is removed by first retracting the thumb screw 80 (FIGS. 18–19) and pulling the clamp outwardly to withdraw the tined-end 78 from its embracement of the flat part 23 of the tie-bolt 27. With the clamp 27 removed, the air-inlet tube 51 and the rod 163 may be removed from the pump-converter unit B. Thereupon, that unit may be lifted out of the tank A. This will permit the complete dismantling of the pump-converter B to subject all parts to a thorough cleansing. The tank A, also, may be thoroughly cleansed.

The removal of the parts of the congealing receptacle C first requires the counter-clockwise turning of the plate 119 to remove the hooks 120 from seating over the headed pins 121. With the plate 119 thusly removed the end closure member 102 may be withdrawn from the outer end of the casing 101. This will permit the axial withdrawal of the scraper 104. The dispensing spigot 118 and the scraper 104 then are dismantled for effecting a thorough cleansing of such parts.

When the apparatus is to be put in service, the reassembled pump-converter unit B is positioned over the opening 23, in the back wall of the tank A with the shaft 26 and tie-bolt 27 extending outwardly through the opening 23 and with the nipple 94 aligned with the tank bottom opening 25. As the unit B is set thusly in place, the shaft 26 will be telescoped into the coupling on the driven shaft of the motor 49. The clamp 76 will have the tined-end 78 seated over the flat part 73 of the tie-bolt 27 and the thumb-screw 80 turned to pull the pump-housing part 32 tightly up against the inner face of the back wall 22 with the O-ring 88 in place.

These parts being positioned thusly in and on the tank A, the air-inlet tube 51 and the rod 163 are set in position as shown in FIG. 3. The rocker arm 162 then may be set in position as shown in FIG. 3 and the spring 177 swung down to seat the outer extremity thereof in the notch 181.

The reassembling of the congealing receptacle C requires very careful attention. The insertion of the scraper 104 requires the successive setting of the scraper blades 137 each in the grooved head 138 of each T-shaped arm 136. Such a blade 137 is set in the first arm-hub 138 and the edge of the blade 137 flexed into the curvature as shown in FIG. 9. As each successive arm 136 approaches the open end of the casing 101 a blade 137 is placed in the next groove and the outer portion of the blade flexed into the noted position, to permit the continued pressing of the scraper 104 into the casing 101.

When the scraper 104 is so completely assembled and pressed into the casing 101, the scraper shaft 115 is supported only by the blades 137 in centered axial relationship with the casing 101, pending the engagement of the coupling sections 151 and 152 (FIGS. 3 and 20).

Following this operative union of the coupling 135, the end member 102, with the spigot 118 and the plate 119 in place, is telescoped into the outer end of the casing 101, with the O-ring 117 in place and the orifice 128 at the uppermost position as shown in FIG. 3. Such seating of the end member 102 also involves telescoping of the sleeve bearing 113 over the channeled end 114 of the shaft 115. With this end member 102 in proper position, the plate 119 is turned clockwise to set the hooks 120 over the headed pins 121.

Thereupon the operation of the apparatus is as follows:

The tank A is supplied with the desired quantity of the selected liquid. In the trade this generally is referred to as the "mix." The cap 52 is set in the required position on the tube 51 to provide the desired quantity of air to be integrated with the liquid "mix." The circuits to the motors 49 and 186 are closed and the apparatus proceeds to function. Thereupon the motor 49 effects the operation of the pump-converter unit B to fill the congealing chamber C to its full capacity.

With the gears 34 and 35, rotating at a relatively high speed, the liquid is drawn into the peripheral portion of the cavity 37 defined by the teeth on the gear 35. The path of such flow is through the aperture 43 and the slot 44. Simultaneously, air is drawn into the peripheral portion of the cavity 36 defined by the teeth on the gear 34. The flow is down through the pipe 51 into the inlet 41, through the aperture 42 and the slot 45 into the peripheral portion of the cavity 36 defined by the teeth on the gear 34. A continuous flow of slugs of air and liquid, between the teeth of the gears 34 and 35, is drawn into the overlapping above-described portions of the cavities 36 and 37 to initiate the inter-mixing of the air and liquid and discharge thereof through the port 46 into the converter element 29.

It is in the converter element 29 that this initial and incidental mixing of the air and liquid is pressured through a tortuous path with so great a turbulence as to reduce the air bubbles to such small size as to produce a highly stable product with a very fine texture and possessing an enduring resistance to disintegration of the mixture. Such a result is effected by either of the converter element adaptations E or F of FIGS. 11 and 12 or FIGS. 13 and 14 as now will be explained.

In FIG. 12 the coarse mixture, discharged from the pump 28 enters through the port 46 into the uppermost pocket 64—of disk 54—which in FIG. 3 is directly adjacent the pump-housing plate 33. From that pocket 64 the mixture is pressured through the orifice 63, at the left of FIG. 12, into the two pockets 64 in disks 55 and 56. These orifices 63 being of different areas, part of the entering mixture is diverted through an orifice 62 into a pocket 64 in the same disk 54 whereas part of the entering mixture passes through the larger orifice 63 into the pocket 64 in the disk 56. The flowback through the orifice 62 into the pocket 64 of disk 54 is baffled back against the disk 59 and then back against the plate 33 and then back through an orifice 62 in the disk 59 into the next pocket 64 in the disk 55. Meanwhile, the flow through the orifice 63 in the plate 60 is baffled back against the plate 60 and then flows out through the orifice 62 in the plate 61 into a pocket 64 in the disk 57. In this pocket 64 the flow is baffled back and forth between the tie-bolt head 31 and the plate 61 from which the flow then passes through the next orifice 62 in the plate 61 into the next pocket 64 in the disk 56. As the second set of arrows to the right indicate, the flow from those two pockets 64 in the respective disks 55 and 56 tend to meet in head-on impingement through the orifice 63 in the plate 60. Obviously, such head-on collision of these oppositely-directed jets tend to baffle the flow back into the respective pockets 64 in these same two disks 55 and 56. This has a further integrating effect of the air and liquid quite similar to that which occurs from the baffling back of the flow by the plates in this adaptation of the converter element 29. Such a described baffling and turbulent flow continues on through the succession of circular series of pockets 64 in the several disks 54, 55, 56 and 57—as indicated in the continuing series of arrows in FIG. 12—until the final flow is discharged through the port 93 into the bore 90 of the tie-bolt head 31 (FIG. 4).

In the structural adaptation illustrated in FIG. 14, a similar impinging, baffling and turbulent flow occurs. In this adaptation, the flow entering through the port 46 into the first of the pockets 68 is baffled against the partition 70. Some of this flow is baffled back against the plate 33 before being jetted through the first orifice 71 into the pocket 69. Here the flow is baffled back and forth in the pocket 69 before the flow is jetted through the orifice 71 into the next pocket 68. In this pocket 68 the flow again is baffled successively against the plate 33 and the partition 70, pending the jetting of the flow through the orifice 71 into another of the pockets 69. Such turbulating flow continues on through the recurring circular series of pockets 68 and 69 (FIG. 13)—and as indicated by the arrows in FIG. 14—until the flow finally is discharged through the port 93 into the bore 90 of the tie-bolt head 31 (FIG. 4).

By the time this air-liquid flow from the pump 28 has been thusly pressured through the converter 29 (of either adaptation E or F) into the bore 90 of the tie-bolt head 31, the initial nature of the air bubbles has been so greatly reduced in size as to produce a very refined foamy substance with an exceedingly fine texture. Such a mixture will be very slow to disintegrate during a considerable time even when exposed to atmospheric pressures even after being dispensed through the spigot 118. It is well known that the more refined the size of the air bubbles are, in such foamy substance, the longer it takes for the dissolution of the air from the mixture to reduce it to the initial liquid condition as it enters the pump 29 from the tank A.

The theory which is believed to account for this assertion is diagrammed in FIG. 15. There can be no question but what in the mixture effected by the pump and discharged through the port 41 has air bubbles of a very considerable size. This is indicated by the circles $r$ in FIG. 15. As these coarse bubbles in the air-liquid-mix are jetted toward and through one orifice after another the bubbles $r$ tend to become successively attenuated as shown by the symbol $l$ in FIG. 15. As these attenuated bubbles $l$ approach nearer an orifice they tend to change to a hair-like condition as indicated by the symbol $s$. As the mixture is forced through the orifice the air bubbles become stringy as indicated by the symbol $t$. After passing through the orifice the jet of mixture is impinged against a flat surface and the stream of air-liquid mixture is further refined as indicated by the symbol $z$.

In each such jetted flow through these series of orifices and through the circular series of pockets, in either of the adaptations E or F, there is an increasing refinement of the foamy condition of the mixture. By the time this constantly refining mixture is discharged through the port 46, the air bubbles have been reduced to a size that would require a rather strong microscope to detect them in the resulting mixture.

This highly-refined and extremely stable mixture thereupon is pressured through the conduit 97 directly into the congealing receptacle C (FIGS. 3 and 4). Such continuing flow of the mixture through the conduit 97 pressures it forwardly along the casing 101. The most advancing portion of the mixture becomes congealed and pressured forward by the continuing pressure of the fluid mixture through the conduit 97.

As the mixture begins to flow into the casing 101 it is necessary to insert a small-diameter pin through the registering orifices 127 and 128 (upper front end of FIG. 3) and into the casing interior. This will dislodge the adjacent part of the O-ring 117 enough to vent the casing until such time as all of the air is pressured out by the inflow of the mixture.

As this refined stable mixture is pressured forward into and through the length of the casing 101 it begins to congeal, of course, at the forward end thereof. During all of this time, the scraper 104 is revolving very slowly. It should be noted that this scraper 104 is in no sense a beater, whipper, agitator or stirrer. The function of the scraper 104 is merely to slowly and continuously remove the mixture from the interior surface of the casing 101, as it tends to congeal, and mix it with the still-fluid mixture at or near the core of the casing 101.

Due note should be taken of how small a portion of the total volume of the casing is displaced by the volume of the scraper 104. The small diameter shaft 115, the small T-shaped arms 136 few in number, the integrated hubs 138 and the scraper blades 137 constitute a small volume compared to the total volume of the casing 101. Thus the major portion of the volume of the casing 101 is occupied by the mixture, congealed and in the process of congealing. The mixture effected by the pump-converter unit B has been so refined that any further agitation would be futile. Hence, there is no reason for activating the mixture in the casing 101, by the scraper 104, other than to ensure folding the peripherally-congealing film back into the cold but as yet not congealed portion nearest the core thereof.

When a predetermined volume of the mixture within the casing 101 has become congealed to a certain degree, a back pressure develops on the continued discharge of the fluid into the bore 90, in the tie-bolt head 31 and conduit 97. This will so act against the bottom of the cup 100 (FIG. 4) as to initiate an upward movement of the rod 163. Thereupon the rocker arm 162 will swing on its pivot pin 171 and increase the tension on the spring 177. In due course the rocker arm 162 will be retracted to a point such that the screw 167 will permit no further retraction of the microswitch 161. When the rocker arm 162 recedes from contact with the pin 169 it causes the opening of the circuit to the motor 49 to arrest its further operation. However, the back pressure of the cup 100 will be maintained and the rocker arm 162 will remain in its retracted position until there had been a sufficient dispensing of the frozen confection through the spigot 118 to reduce the back pressure of the conduit 97. The consequent release of the back pressure in the conduit 97 will so relax the pressure on the cup 100 as to permit the spring 177 to effect a restoration of the rocker arm 162 in the position shown in FIGS. 3 and 4. This will cause a closing of the microswitch 161 and a resumption of the operation of the motor 49. The restoration of the pressure through the conduit 97 into the casing 101 will cause the product to move forward therein. Thereupon the above-described operation of the apparatus will be resumed and continued until there is another build-up of back pressure in the conduit 97.

Variations and modifications in the details of structure and arrangement of the parts may be resorted to within the spirit and coverage of the appended claims.

We claim:

1. An apparatus for dispensing frozen-confection products comprising, a tank for containing a liquid, an adjacently-positioned congealing receptacle, a motor-driven air-liquid mixing pump having separate liquid and air inlets and a mixture outlet port, the liquid inlet drawing liquid directly from the tank and the air inlet drawing air ambient of the liquid in the tank, and a baffling element interposed between the pump outlet port and the receptacle and structured to define a spiraling tortuous flow path through which the air-liquid mixture from the pump outlet-port is pressured to create a continuing turbulence of the air-liquid mixture to effect the increasing miniaturization of air bubbles in the mixture before discharged into the receptacle.

2. An apparatus as set forth in claim 1 wherein the congealing receptacle comprises a cylindrical casing, a pair of members closing the opposite ends of the casing, a dispensing spigot in one of the end members, a shaft extending the length of the casing and rotatively supported on the end members, a plurality of axially-spaced, radially-disposed arms, a flexible strip secured to each arm with the exposed edge of the strip in contact with the interior surface of the casing, and motor-driven means for rotating the shaft at an r.p.m. slow enough to merely cause the strips to scrape the congealing mixture from the interior surface of the casing and direct it inwardly into the core of the mixture in the casing.

3. An apparatus as set forth in claim 1 wherein a conduit connects the tank directly to the receptacle and the pump and element are axially juxtaposed and submerged in the tank and an air-inlet tube extends upwardly from the pump air-inlet above the liquid in the tank and amounts an adjustable cap for regulating the air-flow to the pump.

4. An apparatus as set forth in claim 3 including a tie-bolt having a head with a bore extending therethrough for the discharge of the air-liquid mixture from the element through the conduit to the receptacle, the tie-bolt extending through the pump and the element and clamping them in fluid-seal axial juxtaposition, and means for securing the tie-bolt to the tank.

5. An apparatus as set forth in claim 3 including a tie-bolt having a head with a bore extending therethrough for the discharge of the air-liquid mixture from the element, the tie-bolt extending through the pump and the element for clamping them in fluid-seal axial juxtaposition with the tie-bolt bore registering with the conduit, and the element is in the form of a single disk having a circular series of pockets on opposite sides of an intermediate partition and closed respectively by the pump and the tie-bolt head, the pockets on one side of the partition being eccentrically arranged with respect to the pockets on the other side of the partition and the disk partition having a circular series of orifices so connecting the pockets as to form the tortuous flow path for the pump-pressured air-liquid mixture.

6. An apparatus as set forth in claim 3 wherein the congealing receptacle comprises a cylindrical casing, a pair of removable members closing the opposite ends of the casing, a dispensing spigot in one of the end members, a shaft extending the length of the casing and rotatively supported on the end members, a plurality of T-shaped arms each with the stem part integrated with the shaft and spaced axially therealong and the transverse hub parts spaced radially outward from the shaft with no axial overlapping of the hub parts, the hub parts each having an axially-disposed peripheral slot formed therein and a narrow strip of semi-flexible material seated in each hub-part slot with the exposed marginal portion of the strip flexed to pressure the edge thereof against the interior of the casing to cause the scraping of the congealing mixture from the surface of the casing and direct it interiorly into the core of the casing, and motor-driven means for rotating the shaft at a r.p.m. slow enough to merely cause the strips to scrape the congealing mixture from the interior surface of the casing and direct it inwardly into the core of the mixture in the casing.

7. An apparatus for dispensing frozen-confection products comprising, a tank containing a liquid, an adjacently-positioned congealing receptacle, a conduit connecting the tank to the receptacle, a motor-driven air-liquid mixing-pump having separate liquid and air inlets and a mixture outlet-port, an element interposed between the pump and the conduit and having a series of pockets arranged on opposite sides of a partition, the partition having orifices connecting the pockets on opposite sides of the partition to define a tortuous flow path whereby the pump-pressured air-liquid mixture passed through the pump outlet-port is successively pressured through the orifices and the pockets to create a continuing turbulence of the air-liquid mixture to effect the gradual reduction of air bubbles in the mixture before discharge thereof into the receptacle through the conduit, a normally-closed switch mechanism connected to control the operation of the motor for the air-liquid mixing-pump, a diaphragm exposed to the discharge of the mixture through the conduit into the receptacle, and means juxtaposed to the diaphragm and connected to retract the switch mechanism when the back-pressure of the mixture into the receptacle exceeds a predetermined amount and thereby temporarily arresting the operation of the motor-driven air-liquid mixing-pump.

8. An apparatus as set forth in claim 7 wherein a tie-bolt having a head with a bore extending therethrough for the discharge of the air-liquid mixture from the element through the conduit into the receptacle extends through the pump and the element and clamps them in fluid-seal axial juxtaposition, the diaphragm being in the form of an inverted flexible cup seated in the tie-bolt head bore and exposed to the pump-pressured flow of the air-liquid mixture through the bore into the receptacle, and a rod seated on the cup is connected to retract the switch-mechanism.

9. An apparatus for dispensing frozen-confection products comprising,
 (a) a tank
  containing liquid and
  having a discharge outlet,
 (b) a cylindrical receptacle
  juxtaposed to the tank and
  having an inlet opening,
 (c) a conduit
  connecting the tank outlet
  with the receptacle inlet,
 (d) a pump housing having
  a pair of circular cavities
   eccentrically arranged therein with overlapping peripheral portions,
  a liquid inlet into one of the cavities,
  an air inlet opening into the other of the cavities, and
  an air-liquid mixture outlet leading axially outward from the overlapping portions of the cavities,
 (e) a pair of meshing gears
  rotatively supported in the respective pump cavities in contact with the defining walls thereof,
 (f) a tube
  connected to the pump housing air-inlet and extending exteriorly of the tank, having an adjustable cap on the outer end thereof for regulating the flow of air to the pump housing air-inlet,
 (g) a driven-shaft
  integrated with one of the gears and extending outwardly of the tank for connections with a motor,
 (h) a tie-bolt head having
  a bore therein opening at space points
  secured interiorly in the tank with one end of the bore in fluid-flow alignment with the conduit for the discharge of the air-liquid mixture into the receptacle, and
  having a port for flow of the air-liquid mixture into the bore,
 (i) a disk-shaped element
  clamped between the pump housing and the tie-bolt head and
  having a series of pockets on opposite sides of an intermediate partition and respectively closed by the pump and the tie-bolt head, with the pockets on one side of the partition eccentrically arranged with respect to the pockets on the other side, and
  having a circular series of orifices in the partition so connecting the pockets as to define a tortuous flow path
whereby the pump-pressured air-liquid mixture passed through the outlet-port is successively pressured through the orifices and the pockets to create a continuing turbulence of the mixture before discharge thereof into the receptacle.

10. An apparatus as set forth in claim 9 wherein
 (j) a motor exteriorly of the tank is connected to the driven shaft,
 (k) a spool-shaped nipple
  of compressible material
  interposed between one opening of the tie-bolt head bore and the conduit,
 (l) a cup-shaped member
  invertedly seated in the other opening of the tie-bolt-head bore and
  forming a diaphragm actuatable by pressures in the tie-bolt-head bore,
 (m) a motor circuit-controlling switch
  located externally of the tank,
 (n) a rocker arm
  pivoted exteriorly on the tank in position to engage the switch and spring-actuated to normally bias the switch into circuit-closing position, and
 (o) a rod
  extending exteriorly of the tank and
  having its lower end seated on the cup-shaped member and connected to the trip lever,
whereby a predetermined back-pressure in the conduit will actuate the cup-shaped member to shift the rod and hold the trip lever to open the switch mechanism to arrest the operation of the motor pending a reduction in the back-pressure in the conduit.

References Cited by the Examiner
UNITED STATES PATENTS

| | | | |
|---|---|---|---|
| 1,969,960 | 8/1934 | Blum | 261—79 |
| 2,013,016 | 9/1935 | Vogt | 62—69 |
| 2,013,018 | 9/1935 | Vogt | 62—342 |
| 3,209,554 | 10/1965 | MacManus | 62—306 |

HARRY B. THORNTON, *Primary Examiner.*

T. R. MILES, *Assistant Examiner.*